COLOR TELEVISION IMAGE REPRODUCING SYSTEMS

Filed Jan. 12, 1950 2 Sheets-Sheet 1

Inventor
Vladimir K. Zworykin
Attorney

Sept. 17, 1957 V. K. ZWORYKIN 2,806,899

COLOR TELEVISION IMAGE REPRODUCING SYSTEMS

Filed Jan. 12, 1950 2 Sheets-Sheet 2

Inventor
Vladimir K. Zworykin

By

Attorney 2,806,899

COLOR TELEVISION IMAGE REPRODUCING SYSTEM

Vladimir K. Zworykin, Princeton, N. J., assignor to Radio Corporation of America, a corporation of Delaware Application January 12, 1950, Serial No. 138,088

7 Claims. (Cl. 178—5.4)

This invention relates to the display of intelligence signals in systems embodying a single device for the display of such signals in a plurality of different colors and, particularly, but not necessarily exclusively, to color television image reproducing systems embodying a device of the cathode ray tube type for reproducing an image substantially in its natural colors.

In most of the color television systems which have been sufficiently highly developed for possibly practical commercial use, the underlying principles are of such a character to require the use of relatively complex apparatus. In one particular system which may be considered typical of many of the prior art systems, the complexity thereof arises from the fact that, while only a single image reproducing device such as a cathode ray tube is employed, it also requires a mechanically moving filter device in order to reproduce the image substantially in its natural component colors. Even though such a system is to some degree practical, it has certain inherent disadvantages. Not only is it complex by reason of the embodiment therein of the mechanically moving filter and the apparatus necessary to drive it in synchronism and in proper phase with a corresponding device at the transmitter location, thereby requiring additional space in which to house such apparatus, but also it is subject to the production of objectionable noise and vibration.

It has also been proposed to employ a separate image reproducing device for each of the component colors of the image to be reproduced.

It is an object of the present invention to provide an improved color television image reproducing system which is relatively simple by reason of the employment therein of a single reproducing tube of a novel and improved character, whereby to reproduce an image substantially in its natural component colors.

Another object of the invention is to provide an improved color television image reproducing system embodying an improved type of cathode ray tube capable of displaying all of the component colors of the image to be reproduced and which functions to effect color separation by means of principles which heretofore have not been utilized.

Still another object of the invention is to provide an improved color television image reproducing system embodying a single cathode ray tube for the display of all of the color components of the image to be reproduced and which is provided with means for developing, under the control of a single primary electron beam, a secondary electron beam for each of the elemental areas of the image to be reproduced.

A further object of the invention is to provide an improved form of cathode ray tube for use in a color television image reproducing system and in which is embodied an electrode capable of developing a plurality of secondary electron beams from the different elemental areas thereof when these areas are excited in succession by a single primary electron beam and with which are provided facilities for selectively directing the secondary electron beams onto sub-elemental areas of a luminescent screen from each of which to derive differently colored light.

A still further object of the invention is to provide an improved type of cathode ray tube for use in a color television image reproducing system in which is embodied a secondary electron emissive electrode located between a source of a primary electron beam and a luminescent screen having a plurality of groups of sub-elemental areas capable, respectively, of emitting differently colored light when excited by any of the beams of secondary electrons emitted by the electrode when it is scanned by the primary electron beam.

In accordance with the present invention, there is provided a cathode ray tube having a luminescent screen which comprises a plurality of groups of adjacent areas of sub-elemental dimensions from which may be derived respectively differently colored light when the areas are excited by an electron beam. In one illustrative form of the invention, the luminescent screen may consist of a plurality of different phosphors capable, respectively, of directly emitting differently colored light when excited by an electron beam; or as an alternative, the entire screen may consist of a single phosphor and the tube may be additionally provided with color filters of sub-elemental dimensions through which the screen may be viewed. Additionally, the cathode ray tube is provided with an auxiliary electrode which may be embodied in a number of different forms all of which, however, being capable of emitting secondary electrons from elemental areas thereof when the electrode is impinged by a primary electron beam which may be deflected over the electrode in accordance with a predetermined pattern. The cathode ray tube also is provided with facilities for focusing the secondary electron beams in the plane of the luminescent screen into areas of sub-elemental dimensions. In accordance with the invention, the secondary electron beam focusing may be effected either electrostatically or electromagnetically. Facilities also are provided for selectively controlling the secondary electron beams so that they will impinge upon any selected ones of the sub-elemental screen areas of a group to produce light of the different component colors. The color-selecting control of the secondary electron beams may be effected either electrostatically or electromagnetically as desired. In one illustrative embodiment of the invention, color-selecting control of the secondary electron beams is effected electrostatically under the control of field producing elements attached, or located adjacent, to the auxiliary electrode producing the secondary electrons. In a preferred mode of operation, the field-producing elements effect color-selecting deflections of the secondary electrons.

In accordance with one of the features of the present invention, the secondary electron emitting electrode may take various forms. In one typical embodiment of this electrode it is provided with a plurality of apertures to which the secondary electron emission is confined and which are registered substantially with groups of the sub-elemental areas of the luminescent screen. In one type of apertured electrode structure, there are provided adjacent each of the apertures electrostatic beam deflecting elements which, when suitably energized, effect the deflection of the secondary electron beams emanating from the respective apertures for impingement upon selected sub-elemental areas of the luminescent screen. In another form of secondary electron emitting electrode structure there is provided a relatively thin metallic film or layer which is treated for secondary electron emission substantially uniformly over its entire area. In still another illustrative form of secondary electron emissive electrode structure, the secondary electron emitting portions are shaped in such a manner that the primary electron beam has an oblique incidence thereon, whereby to increase the secondary electron emission.

The novel features that are considered characteristic of this invention are set forth with particularity in the appended claims. The invention itself, however, both as to its organization and method of operation as well as additional objects and advantages thereof will best be understood from the following description taken in connection with the accompanying drawing.

Figures 8, 9, 10:
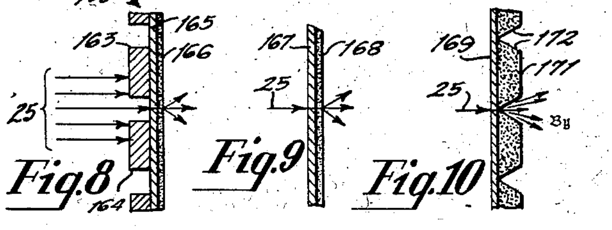
Figure 8 is a fragmentary view to an enlarged scale of an auxiliary electrode with which a cathode ray image reproducing tube may be provided for use in either of the systems shown in Figures 1 and 7 and, particularly, in that form of system shown in Figure 7.

Figure 9 is a fragmentary cross-sectional view to an enlarged scale of another embodiment of auxiliary cathode ray tube electrode in accordance with the invention wherein secondary electron emission is effected substantially uniformly over the entire surface of the electrode; and, Figure 10 is a cross-sectional fragmentary view to an enlarged scale of still another form of auxiliary electrode in accordance with this invention wherein enhanced secondary electron emission is effected.

Although, as will be apparent, the invention is not limited for use in any specific type of color television system, the following description of a number of illustrative embodiments of the invention is taken with particular reference to a color television system of the so-called dot multiplex type. Such a system forms the subject matter of a copending U. S. application of John Evans, Serial No. 111,384, filed August 20, 1949, and entitled "Color Television." In this type of system the video signals, which are generated and transmitted and from which an image is reproduced, represent successively the component color content of each of the elemental areas or dots of the image. The energization of the auxiliary electrode included in the illustrative embodiments of the invention is modified at the color-change frequency of the video signals which, in a three color system, is three times the dot or elemental scanning frequency.

It is to be understood, that the cathode ray tube and the image reproducing system in accordance with this invention may be used, without material modification, in any of the other conventional color television systems including those operating according to the line and field or frame sequential principles. In the line sequential system, successive series of video signals represent the different color content of a succession of entire lines of the image. Likewise in the field or frame sequential system, successive series of video signals represent complete fields or frames of the different component image colors. Substantially the only modification of the herein disclosed illustrative embodiment of the invention that is necessary to adapt it for use in any of these other color television systems is to suitably adjust the frequency of auxiliary electrode energization to conform to the color-change frequency of the video signals in the particular system.

Reference first will be made particularly to Figure 1 of the drawings for a general description of one illustrative embodiment of the invention in a dot multiplex type of color television system. A carrier wave modulated by a composite television signal including video and system control components is intercepted by an antenna 11 and impressed upon a composite television signal receiver 12. It will be understood that this receiver may be entirely conventional and may include the usual radio frequency amplifier, the frequency converter or first detector, the intermediate frequency amplifier and the second or signal detector usually included in a superheterodyne receiver. The output of the receiver 12 is coupled to the video signal circuits 13 which may include apparatus for separating the video signals from the composite television signal and for suitably amplifying the recovered video signals. The output of the signal receiver 12 also is coupled to the deflection control circuits 14 which will be understood to include facilities for recovering the system control signals such as the horizontal and vertical synchronizing signals and the necessary sweep voltage generators by means of which to control the deflection of an electron beam over a target electrode is accordance with well known television receiver practice. There also is provided a keying frequency oscillator 15 which is coupled to the deflection control circuits 14 for control purposes so that the oscillator output voltage may be suitably synchronized and phased with the received television signals. The keying frequency oscillator may be entirely conventional in character as long as it is capable of developing a substantially sinusoidal wave having a frequency corresponding to the color change frequency of the received video signals and is susceptible of frequency and phase control by means of signal impulses derived periodically from the deflection control circuits 14. By way of example, one such oscillator is shown and described in the textbook entitled "Waveforms," published in 1949 by McGraw-Hill Book Co., Inc., page 143, Figure 4–45.

The sinusoidal voltage wave derived from the output circuit of the keying frequency oscillator 15 is similar to that represented by the wave 16 which is impressed as a driving voltage upon the control circuit of a keying voltage source 17 which, for example, may be a ring multivibrator, the circuit details of a specific example of which will be subsequently described. There are developed in the output circuit of the keying voltage source 17 a series of negative voltage impulses such as represented at 18 and a series of positive voltage impulses such as represented at 19. These two voltages are impressed upon the input circuit of a keying voltage adder 21, the specific details of a typical example of which will be described subsequently, for combination in a manner to produce a stepped wave voltage such as represented at 22. It should be understood that the auxiliary electrode energization by means of a stepped wave voltage is merely illustrative of a number of equivalent means which includes a sinusoidal energization as disclosed in a copending U. S. application of Paul K. Weimer, Serial No. 134,453, filed December 22, 1949, and entitled "Color Television Reproducing Systems," now Patent No. 2,650,264, issued August 25, 1953.

Figure 1:
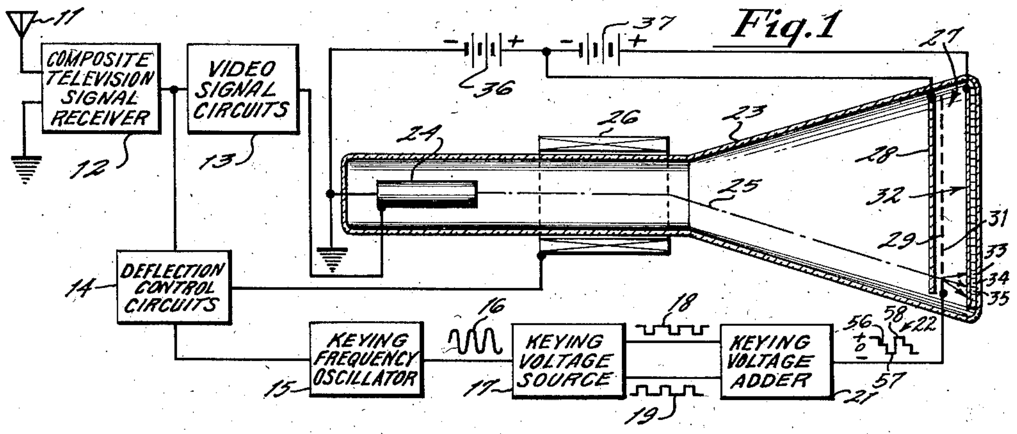
Figure 1 is a block diagram of an illustrative embodiment of the improved color television image reproducing system in accordance with the invention.

The color television image reproducing system of Figure 1 also includes an image reproducing device such as a cathode ray tube 23. It comprises a conventional electron gun structure 24 by which there is developed a primary electron beam 25 which may be deflected in a conventional manner over a target electrode and which may be modulated in intensity in accordance with the received video signals. The video signal circuits 13 are coupled to the usual intensity control electrode (not shown) of the electron gun 24 so as to suitably control the electron beam intensity. The cathode ray tube 23 also is provided with a conventional electromagnetic deflecting yoke 26 which is energized in a suitable manner from the deflection control circuits 14 so as to deflect the electron beam over a target electrode according to a predetermined pattern such as the conventional pattern consisting of a succession of substantially parallel horizontal lines from left to right and from top to bottom, for example. The cathode ray tube 23 also includes an auxiliary electrode system 27 which is shown in detail in Figure 2 and subsequently described. It consists essentially of a thin layer or film 28 which is capable of emitting secondary electrons from the surface thereof which is remote from the electron gun when it is impinged on the side thereof which is adjacent to the electron gun by the primary electron beam 25. The electrode system 27 also includes a plurality of electrostatic deflecting elements such as 29 and 31 located relative to one another so as to define apertures through which the secondary electron beams must pass. The potentials impressed upon the groups of deflecting elements such as 29 and 31 are varied by coupling the auxiliary electrode system 27 to the output circuit of the keying voltage adder 21 so as to variably deflect the secondary electron beams for the purpose of effecting color selection.

The cathode ray tube 23 also is provided with a luminescent screen 32 which consists of a plurality of groups of light emitting areas having sub-elemental dimensions such as 33, 34 and 35, for example. The excitation of respective ones of the sub-elemental areas of the screen 32 by the secondary electron beams produces differently colored light from all elemental areas of the screen. Preferably, in this embodiment of the invention, the auxiliary electrode system 27 and the screen 32 are mounted in relatively close relationship in order to insure that the relatively low velocity secondary electron beams will not be spuriously deflected, for example, by any stray fields to the influence of which the beams may be subjected.

The auxiliary electrode system 27 is maintained at a suitable positive potential relative to the source of the electron beam 25 such as the cathode (not shown) of the electron gun 24 by means of a voltage supply such as represented by the battery 36. Similarly, the luminescent screen 32 is maintained at a suitable positive secondary electron accelerating potential relative to the electrode system 27 by means of a voltage supply such as represented by the battery 37. In this form of the invention, there is produced an electrostatic field between the auxiliary electrode system 27 and the luminescent screen 32 which is of a character to direct the secondary electron beams onto corresponding elemental areas of the screen.

Before describing in detail the operation of the embodiment of the invention shown in Figure 1, additional reference will be made to Figure 2 of the drawings for a detailed description of the auxiliary electrode and luminescent screen structures. The foundation for the electrode system 27 is a wire or other metallic screen or mesh having horizontal members such as 38 and 39. Preferably, this screen structure is of the self-supporting type. On the electron gun side of the screen structure, there is formed the thin layer 28 which may be formed of electron-pervious materials such as aluminum, beryllium, silica, calcium fluoride or zinc silicate, for example. At least those portions of the surface of the film 28 which are exposed through the apertures formed between adjacent screen members such as 38 and 39 are suitably treated as indicated at 42 for relatively high secondary electron emission when the metallic film is impinged by a primary electron beam. The side of the screen opposite to that on which the film 28 is located is provided with a film or layer of insulating material such as 43 which, for example, may be silica. On top of the insulating layers 43 are provided the metallic electrostatic deflecting elements 29 and 31. The secondary electron emissive film 28 is electrically connected to the voltage source 36 of Figure 1 in order to maintain this electrode at a suitable positive potential relative to the source of the primary electron beam 25. Also, as indicated in Figure 2*a*, the metallic strips such as 29 and 31 are suitably connected to the output circuit of the keying voltage adder 21 so as to vary the potential impressed upon different pairs of these strips in accordance with a stepped voltage wave such as 22 of Figure 1 for varying the deflection of the secondary electron beams.

Figure 2:
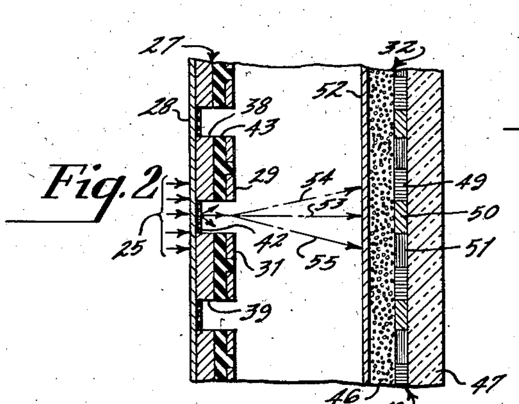
Figure 2 is an enlarged sectional view of a portion of the cathode ray tube embodied in the system of Figure 1 and shows one form of luminescent screen and auxiliary electrode structure.
Figure 2A:
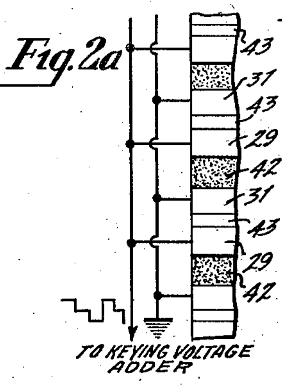
Figure 2a is a face view of an enlarged end portion of the auxiliary electrode of Figures 1 and 2 showing typical electrical connections thereof to a source of energizing voltage.

Also, as shown in detail in Figure 2, the luminescent screen in accordance with the embodiment of the invention shown in Figure 1 comprises a phosphor layer 46 which is uniform in composition and capable of emitting substantially white light when excited by an electron beam. Between the phosphor layer 46 and the glass end wall 47 of the tube envelope there is provided a color filter element 48. The color filter comprises a multiplicity of strips each having different color transmitting properties. These strips as illustrated are arranged in groups of three, for a three color television system, each group having substantially elemental dimensions. For example, in the case where the auxiliary electrode 27 consists of horizontal apertures, one for each elemental line of the image to be reproduced, the color filter device consists of three horizontal differently colored strips, each having a sub-elemental width or thickness and together aggregating the width or thickness of an elemental horizontal line of the image to be reproduced. One group of filter elements consists of a blue strip 49, a green strip 50 and a red strip 51. The rear side of the phosphor layer 46 is provided with a thin metallic coating such as an aluminum film 52 which is electrically connected to the battery 37, as shown in Figure 1. This type of cathode ray tube structure is conventional and is disclosed in greater detail in an article published in Volume VII of the RCA Review of October 1946 at page 5 by D. W. Epstein and L. Pensak, and entitled "Improved Cathode-Ray Tubes with Metal-backed Luminescent Screens."

The impingement of the thin film 28 of the auxiliary electrode system 27 in the vicinity of one of the apertures formed between screen members, such as 38 and 39, by the primary electron beam 25 causes the emission from the reverse side of the film 28 of secondary electrons equal at least in number to the number of impinging primary electrons and preferably being at a greater ratio of emission. The secondary electrons are emitted at relatively low velocity and are accelerated by means of the potential derived from the battery 37 and impressed between the auxiliary electrode system 27 and the luminescent screen 32 for impingement of the metallic screen-backing film 52 in the area thereof lying behind the green color filter section 50 as indicated at 53. The film 52 in accordance with well known practice is thin enough to be penetrated by any of the secondary electron beams so that they are effective to excite the phosphor layer 46. Similarly, when it is desired to produce blue colored light, the deflecting strips such as 29 and 31 are energized to deflect the secondary electron beam for excitation of the luminescent screen 32 as indicated at 54 in an area thereof lying behind the blue filter element 49. In like manner, red colored light is produced by deflecting the secondary electron beam as indicated at 55 under the control of the suitably energized deflecting strips such as 29 and 31 so that it impinges upon an area of the luminescent screen lying behind a red color strip 51.

The deflecting elements such as 29 and 31 also serve to focus the secondary electrons, which have relatively low and somewhat random velocities when emitted, into relatively fine beams in the plane of the luminescent screen 32. This type of electron focussing is essentially equivalent to that disclosed, for example, in a paper entitled "Electron Optics of an Image Tube," by G. A. Morton and E. G. Ramberg, published in Physics, vol. 7, No. 12, December 1936, and in another paper entitled "Applied Electron Optics," by V. K. Zworykin and G. A. Morton, published in Journal of the Optical Society of America, vol. 26, page 181 (1936). If desired, the elements such as 29 and 31 may be suitably biased relative to the film 28 to enhance the focussing effect.

With the details in mind of the manner in which color selection is effected in accordance with this invention given in the foregoing description of Figure 2, reference again will be made to Figure 1 for a general description of its mode of operation. Assume that at a given instant the received video signal represents the green color component of an elemental portion of the image to be reproduced and that the intensity of the primary electron beam 25 is modulated in accordance with the intensity of the green representative video signal. At this time, the voltage derived from the keying voltage adder 21 is as represented by the step 56 of the wave 22. Consequently, there is no deflecting voltage impressed upon the secondary electron beam deflecting electrode elements such as 29 and 31. The impingement of the primary electron beam 25 upon the secondary electron emissive electrode layer 28 causes the emission of secondary electrons in numbers corresponding to the intensity of the primary electron beam. These secondary electrons are not deflected and are caused to excite the green-producing color area 34 of the luminescent screen 32. At the next succeeding instant, assume that the received video signal represents the red color component of an elemental portion of the image to be reproduced. At this time, there is impressed upon the secondary electron beam deflecting electrode elements such as 29 and 31 a voltage such as represented by the step 57 of the wave 22. When energized by such a voltage the deflecting elements such as 29 and 31 cause the secondary electron beam to be deflected downwardly so that it impinges upon the red light producing area 35. Similarly, when the video signal represents the blue color component of the image to be reproduced, the secondary electron beam deflecting elements such as 29 and 31 are energized by a voltage such as represented by the step 58 of the wave 22, thereby causing the upward deflection of the secondary electron beam for impingement upon the blue-producing area 33 of the luminescent screen 32.

Figure 3:
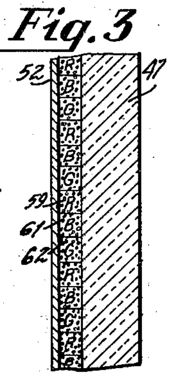
Figure 3 is an enlarged fragmentary sectional view of a portion of a cathode ray tube in accordance with the present invention and shows another form of luminescent screen structure.

Instead of providing the cathode ray tube 23 with a luminescent screen structure which includes a color filter device, the screen alternatively may be made in such a manner as to obviate the necessity for employing a color filter. Figure 3 illustrates such an alternative luminescent screen structure. The inside surface of the end wall 47 of the tube may be coated with strips of phosphors respectively having the properties of emitting differently colored light when excited by an electron beam. The phosphors may be laid down in strips such as 59, 61 and 62 capable respectively of emitting red, blue and green light. As in the previously described embodiment of the invention, the phosphor screen may be backed by an electron pervious metallic film 52. The different phosphor strips such as 59, 61 and 62 have sub-elemental widths so that each group of strips has a width which is substantially equal to the elemental width of a horizontal line of the image to be reproduced. The mode of operation of a luminescent screen of the character shown in this figure in a system embodying the present invention is considered to be obvious in view of the foregoing description of the type of luminescent screen shown in Figure 2.

Figure 4:
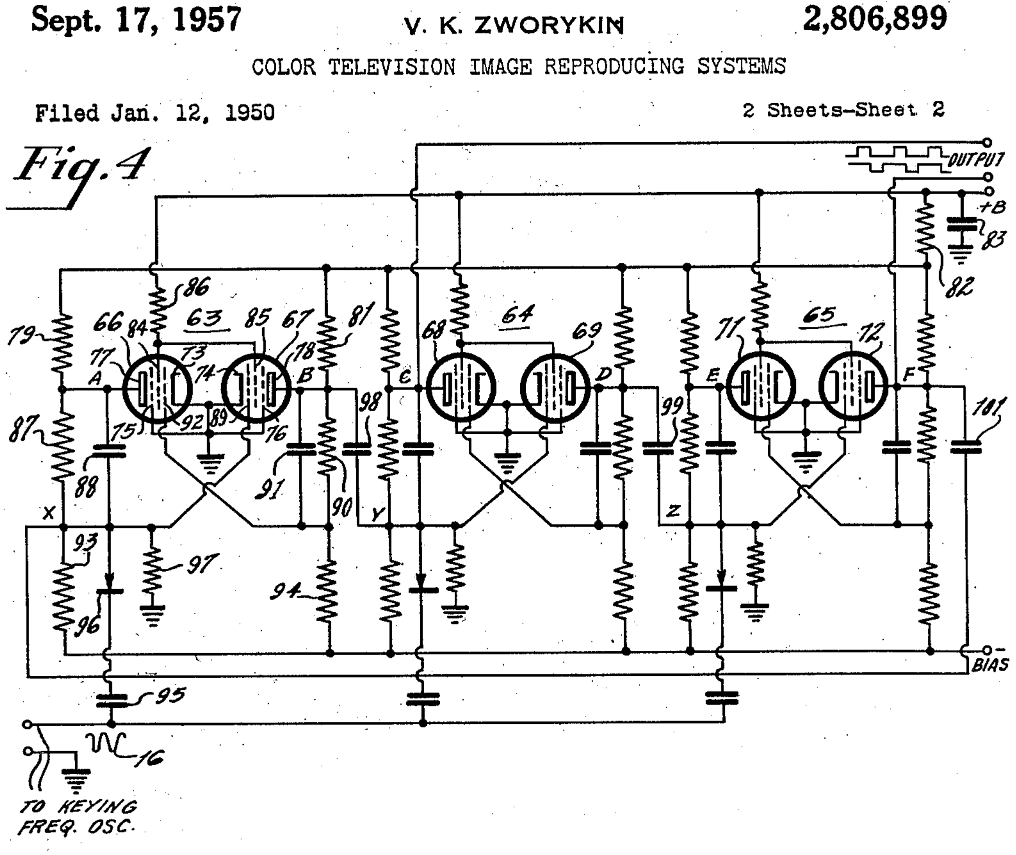
Figure 4 is a circuit diagram showing representative details of one of the circuit components of Figure 1.

Before describing another illustrative embodiment of a color television image reproducing system in accordance with the invention and other alternative forms of certain of the electrode structures and the general arrangement of these electrodes in a cathode ray tube in accordance with the invention, reference will be made to Figures 4, 5 and 6 for a disclosure of typical examples of certain of the circuit components employed in any of the embodiments of the system according to this invention. Initially, reference will be made particularly to Figure 4 wherein there are illustrated the details of a typical keying voltage source such as indicated generally at 17 of Figure 1. The keying voltage source of Figure 4 is commonly known as a ring multivibrator. It consists of as many multivibrator units as there are color components of the image to be reproduced. In the present instance, wherein it is assumed that the invention is embodied in a three color system, the keying voltage source consists of three multivibrator units 63, 64 and 65. The circuit details of each of these multivibrator units are substantially identical in the respective units and, consequently, only one such unit will be described particularly.

The multivibrator unit 63 includes a pair of electron tubes 66 and 67; the multivibrator 64 includes electron tubes 68 and 69; and the multivibrator 65 includes electron tubes 71 and 72. The cathodes 73 and 74, respectively, of tubes 66 and 67 are connected together and also to the respective suppressor grids 75 and 76, respectively, and are maintained at ground or other fixed potential. The anodes 77 and 78, respectively, of the tubes 66 and 67 are connected through individual load resistors 79 and 81, respectively, and also through a common voltage-dropping resistor 82 to the positive terminal of a source of space current indicated at +B which also is bypassed to ground by a capacitor 83. The screen grids 84 and 85, respectively, of the tubes 66 and 67 are connected together and through a common voltage-dropping resistor 86 to the terminal +B. The anode 77 of the tube 66 is cross-coupled by means of a network including a parallel arrangement of a resistor 87 and a capacitor 88 to the control grid 89 of the tube 67. Similarly, the anode 78 of the tube 67 is cross-coupled by means of a parallel arrangement of a resistor 90 and a capacitor 91 to the control grid 92 of the tube 66. These cross-coupling arrangements are conventional in multivibrator practice and further description thereof is, accordingly, considered unnecessary. The control grids 89 and 92, respectively, of tubes 67 and 66 are suitably biased relative to their associated cathodes by means of the connection thereof through respective resistors 93 and 94 to a suitable source of negative biasing voltage indicated at —Bias.

The multivibrators 63, 64 and 65 are provided respectively with output terminals A—B, C—D and E—F and also respectively with input terminals X, Y and Z. For controlling the timing of the operation of the ring multivibrator the input terminals are coupled to a source of a timing wave such as the keying frequency oscillator 15 of Figure 1. For example, the input terminal X of the multivibrator 63 is coupled to the keying frequency oscillator by means of a circuit which includes the series arrangement of a capacitor 95 and a unilaterally conducting device such as a crystal diode 96 and a shunt resistor 97. The diode 96 is connected in the circuit in such polarity that only the negative half cycles of the timing voltage wave 16 are effective to control the operation of the ring multivibrator. Preferably, the parameters of the coupling circuit to the input terminals X, Y and Z of the ring multivibrator are so chosen that only the peaks of the negative half cycles of the voltage wave 16 are effective.

The output terminal B of the multivibrator 63 is coupled by a capacitor 98 to the input terminal Y of the multivibrator 64. Similarly, the output terminal D of the multivibrator 64 is coupled by a capacitor 99 to the input terminal Z of the multivibrator 65. In like manner, the output terminal F of multivibrator 65 is coupled by a capacitor 101 to the input terminal X of multivibrator 63. For the purpose of deriving a stepped voltage wave particularly adapted for use in connection with the present invention, the voltages developed at the output terminals C and F of multivibrators 64 and 65 respectively are utilized.

The manner in which the keying voltage source of Figure 4 operates to generate the voltages which are combined by the keying voltage adder 21 of Figure 1 to produce the required stepped voltage wave 22 will be described with additional reference to Figure 5. In this figure the waveforms 102 to 107 represent respectively the voltages developed at the multivibrator output terminals A to F. The wave 108 represents the sinusoidal voltage output derived from the keying frequency oscillator 15 of Figure 1. A cycle of operation will be assumed to start at a time at which the tubes 67, 68 and 71 are conducting and the tubes 66, 69 and 72 are nonconducting. At this time, the voltage developed at the output terminal B has a minimum positive magnitude as indicated at 109 of curve 103 and the voltage developed at the output terminal A has a maximum positive magnitude as indicated at 110 of curve 102. At the occurrence of the next succeeding negative peak 111 of the timing voltage wave 108, there is impressed a negative voltage upon the input terminals X, Y and Z. The impression of this negative voltage upon the control grids of the multivibrator tubes 69 and 72 is ineffective for the reason that these tubes are nonconducting. However, the impression of this negative voltage upon the control grid 89 of the tube 67 effects the termination of space current conduction in this tube with the concomitant initiation of the conduction of space current in the tube 66 in accordance with well known multivibrator operation. Consequently, there is developed a voltage at the output terminal B of the multivibrator 63 which is of increased positive magnitude as indicated by the curve 103 so that, by means of the coupling capacitor 98, a positive voltage is impressed upon the input circuit of the tube 69 of the multivibrator 64. As a result, conduction of space current is initiated in this tube and is terminated in the companion tube 68. The voltage developed at the output terminal C, therefore, increases to a positive maximum as indicated at 112 of the curve 104 and the voltage developed at the output terminal D decreases to a positive minimum as indicated at 113 of the curve 105.

The next succeeding negative peak 114 of the timing wave 108 is ineffective to control tubes 67 and 72 but is effective to terminate the conduction of space current in the tube 69, whereupon the conduction of space current in the tube 68 is again initiated. The increased positive voltage developed at the output terminal D of the multivibrator 64 as indicated by the curve 105, when impressed by the coupling capacitor 99 upon the input circuit of the tube 72 of multivibrator 65 is effective to initiate the conduction of space current in this tube, as a result of which the conduction of space current in the tube 71 is terminated. Consequently, the voltage developed at the output terminal E increases to a positive maximum as indicated at 115 of the curve 106 and the voltage developed at the output terminal F decreases to a positive minimum as indicated at 116 of the curve 107.

The occurrence of the following negative peak 117 of the timing wave 108 is ineffective to control tubes 67 and 69, but effects the termination of the conduction of space current in the tube 72 which is effective to again initiate the conduction of space current in the tube 71. The voltage developed at the output terminal F increases to a positive maximum as indicated by the curve 107 which, when impressed by the coupling capacitor 101 upon the input circuit of the tube 67 of multivibrator 63, again initiates the conduction of space current in this tube. The described cycle of operation then is repeated.

Figure 6:
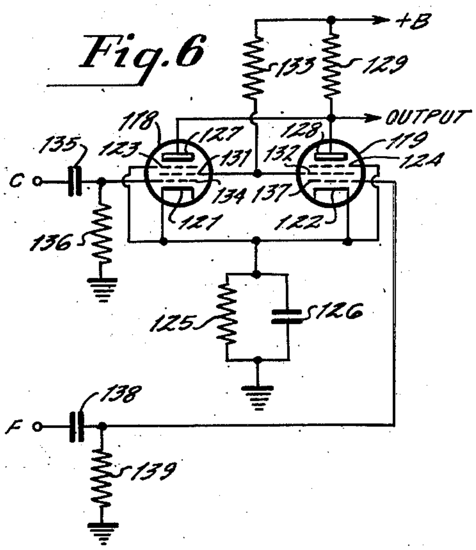
Figure 6 is a circuit diagram showing the details of another circuit component of Figure 1.

The voltages represented by the curves 104 and 107, derived respectively from the output terminals C and F of the keying voltage source of Figure 4 are combined by means such as the apparatus shown, by way of example, in Figure 6 for the production of the stepped voltage wave 22 of Figure 1. Referring now to Figure 6, the keying voltage adder includes electron tubes 118 and 119 which, by way of example, are shown as pentodes. The cathodes 121 and 122 and the associated suppressor grids 123 and 124 of the tubes 118 and 119, respectively, are connected together and through a self-biasing network comprising a parallel arrangement of a resistor 125 and a capacitor 126 to ground or other point of fixed reference potential. The anodes 127 and 128, respectively, of the tubes 118 and 119 are connected together to the output circuit and through a common load resistor 129 to a suitable source of space current for the tubes indicated at +B. The screen grids 131 and 132, respectively, of the tubes 118 and 119 are connected together and through a common voltage-dropping resistor 133 to the +B terminal. The control grid 134 of the tube 118 is coupled to the output terminal C of the keying voltage source by a series capacitor 135 with which is associated a shunt-connected leak resistor 136. Similarly, the control grid 137 of the tube 119 is coupled by a series capacitor 138 and a shunt-connected leak resistor 139 to the output terminal F of the keying voltage source.

The keying voltage adder of Figure 6 operates substantially in the following manner. There is impressed upon the control grid 134 a voltage having the wave form illustrated by the curve 104 of Figure 5. Similarly, there is impressed upon the control grid 137 of the tube 119 a voltage having substantially the waveform shown by the curve 107 of Figure 5. It will be noted that the voltage wave 104 has a maximum positive amplitude during a period of unit length and a minimum positive amplitude for two succeeding periods of unit lengths. Also, it will be seen that the voltage wave 107 has a minimum positive amplitude for a period having a unit length and a maximum positive amplitude for two succeeding periods of unit lengths. Also, by comparing the time relationship of the voltage waves 104 and 107, it will be seen that during the periods indicated at 141 and 142, respectively, the voltage at the output terminal F is maximum while the voltage at the output terminal C is minimum.

Let it be assumed that, in response to the impression of minimum positive voltages upon the respective control grids of the adder tubes 118 and 119, the input circuit biasing of these tubes is of such a character that the tubes conduct space current of minimum magnitude. In some instances, it may be desirable to so bias these tubes that, under such conditions, conduction of space current therein is completely interrupted. Assume for the purpose of the present invention that the latter condition prevails. Accordingly, during the interval represented by 141 and 142 of the curves 104 and 107 space current is conducted in the tube 119 only. As a result, there is developed at the output terminal of the keying voltage adder a voltage of intermediate magnitude as represented by the step 143 of the curve 144 of Figure 5 representing the waveform of the output voltage derived from the adder.

In the next succeeding period the input voltage to the control grid 137 of the tube 119 remains unchanged as indicated at 145 of the curve 107, while the magnitude of the input voltage to the control grid 134 of the tube 118 is increased to a positive maximum as indicated at 146 of the curve 104. As a result, space current is conducted in the tube 118 having a magnitude which will be assumed to be equal to that of the space current conducted in the tube 119. An additional voltage drop is produced in the load resistor 129, thereby decreasing the amplitude of the voltage derived from the output terminal as represented at 147 of the curve 144.

In the next succeeding time interval the voltage impressed upon the control grid 134 of tube 118 decreases to a minimum as indicated at 148 of curve 104 and the voltage impressed upon the control 137 of tube 119 also decreases to a minimum as indicated at 149 of curve 107. Consequently, the conduction of space current is interrupted in both of the adder tubes, thereby developing a voltage of maximum positive amplitude at the output terminal, as indicated at 151 of curve 144. The described cycle of operation then is repeated.

Figure 5:
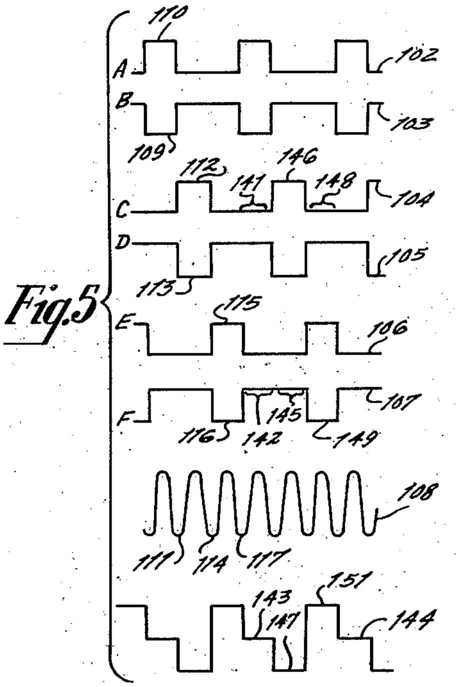
Figure 5 is a series of curves showing typical waveforms of voltages for reference in explaining the operation of the improved color television image reproducing system embodying the invention.

It is seen that the waveform of the voltage derived from the output terminal of the keying voltage adder, such as represented by the curve 144 of Figure 5, is of the type which is required to suitably energize the deflecting plates of the auxiliary electrode 27 of the tube 23 of Figure 1. For this particular use, the output circuit of the adder 21 may be coupled to the electrode 27 in a manner well known to those skilled in the art, whereby the intermediate amplitudes of the stepped voltage wave are effective to maintain the potentials of the respective electrostatic field producing elements such as 29 and 31 at substantially the same potential so that no electron beam deflecting field is produced and, in response to the maximum and minimum amplitudes of the stepped voltage wave, the relative polarities of the deflecting elements such as 29 and 31 are reversed so as to produce deflection of the secondary electron beams in opposite directions.

Figure 7:
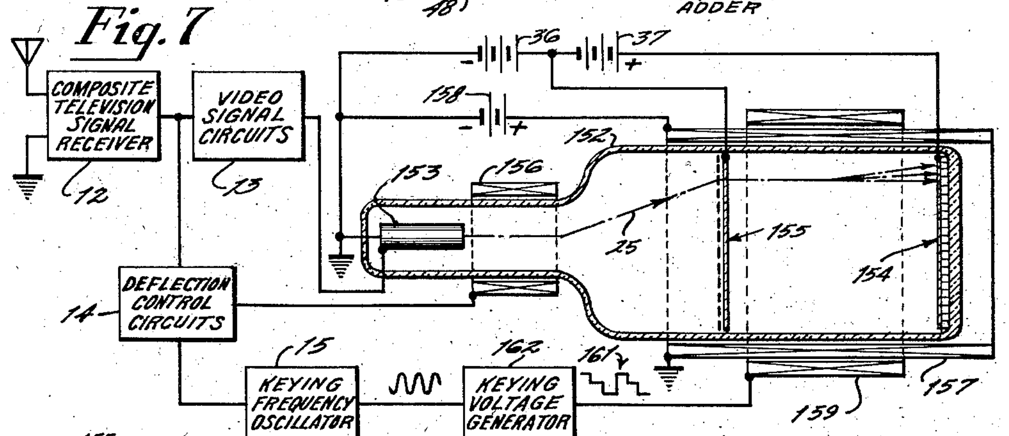
Figure 7 is a block diagram of another embodiment of the color television image reproducing system in accordance with the invention.

Referring now to Figure 7 of the drawings, there is shown another illustrative embodiment of a color television image reproducing system in accordance with the invention. The circuit components of the system are essentially the same as in the system illustrated in Figure 1. In this case, however, there is provided an image reproducing cathode ray tube 152 including a conventional electron gun 153, a luminescent screen 154, an auxiliary secondary electron emissive electrode 155, and a primary electron beam deflecting yoke 156. In this case, the auxiliary electrode 155 is somewhat more widely spaced from the luminescent screen 154 than in the case of the cathode ray tube 23 of Figure 1. Surrounding and also extending somewhat on either side of this space, the tube is provided with an electromagnetic focussing coil 157 which may be suitably energized in a conventional manner such as indicated by a battery 158. The potentials of the luminescent screen 154, the auxiliary electrode 155 and the electron gun 153 are maintained relative to one another in a manner substantially identical with that shown in Figure 1 by means such as indicated by the batteries 36 and 37. The tube also is provided with a secondary electron beam electromagnetic deflecting facility comprising a coil 159 surrounding the space between the auxiliary electrode and the luminescent screen and which may be energized by a stepped voltage wave 161 derived from a keying voltage generator 162. The keying voltage generator may be substantially identical to the combination of keying voltage source 17 and keying voltage adder 21 of Figure 1.

The luminescent screen 154 may be similar to either of the forms shown in Figures 2 and 3 or their equivalents. Similarly, the auxiliary electrode 155 may be of the form shown in Figure 2 or it may be of the form shown specifically in Figure 8 to which reference now will be made. This electrode comprises a self-supporting screen including a plurality of horizontal cross members such as 163 and 164 which are spaced apart substantially as shown thereby defining a plurality of horizontal elemental apertures. The side of the screen which is remote from the electron gun 153 is provided with a thin metallic film 165, the entire exposed surface of which is treated for secondary electron emission as indicated at 166.

The mode of operation of the system shown in Figure 7 is similar to that of the system shown in Figure 1. Briefly, it comprises the deflection of the primary electron beam 25 over the auxiliary electrode 155 to effect the emission of secondary electrons which are formed into elemental beams and focussed by means of the coil 157 onto elemental areas of the luminescent screen 154. The color selecting deflection of the secondary electron beams is, in this case, produced electromagnetically by varying the excitation of the coil 159 by means of a stepped wave voltage such as indicated at 161.

Still another form of auxiliary electrode in accordance with the invention is shown in Figure 9. It comprises a metallic sheet or layer 167 which preferably is self-supporting or at least requires a minimum of supporting elements. The surface of the sheet 167 which is adjacent to the luminescent screen is treated for copious secondary electron emission as indicated at 168. It will be noted in this case that there are no apertures defined by the auxiliary electrode structure. Consequently, it is necessary to effect registration between the primary electron beam 25 and the elemental areas of the luminescent screen to be excited by the resulting secondary electron beams.

Still another form of an auxiliary electrode in accordance with this invention is shown in Figure 10. In this case, there is provided a metallic plate or electron pervious film 169 which, preferably, is self-supporting. The surface of this plate which faces the luminescent screen is treated for copious secondary electron emission as indicated at 171. In accordance with this form of electrode structure, the secondary electron emitting surface is broken by the formation therein of angular grooves or notches which, in the illustrative embodiment, are substantially V-shaped. By this means oblique surfaces 172 are presented to the impinging primary electron beam 25. The angular incidence of the primary electron beam upon these oblique surfaces enhances somewhat the secondary electron emission, whereby the intensity of the resultant secondary electron beams is increased.

It will be seen that a color television image reproducing system in accordance with this invention has numerous inherent advantages over prior art color television systems. By reason of the embodiment of a color-selecting system of the character described, wherein a primary electron beam is employed principally to effect the emission of secondary electrons from elemental areas of a target or auxiliary electrode and wherein the secondary electrons are employed to excite corresponding elemental areas of the luminescent screen, it is possible to separate the functions of effecting the necessary registration of the phosphor-exciting electron beam and the areas of the luminescent screen to be excited thereby from the scanning and electron beam intensity control functions. Such a cathode ray tube structure permits the phosphors to be excited by electron beams which are substantially normal thereto irrespective of the luminescent screen areas to be excited. At the same time, the effective scanning function may be performed in a substantially conventional manner, whereby the primary electron beam may be directed toward its associated target electrode, which in the present instance, is the secondary electron emissive electrode, at different angles depending upon the areas of the target electrode being scanned. Particularly when the cathode ray tube embodies a secondary electron emissive electrode of any of the types shown specifically in Figures 2, 8 and 10, it is possible to orient the electrode with reference to the luminescent screen so that proper registration of corresponding elemental areas thereof may be effected.

Furthermore, by reason of the use of the secondary electron beams for exciting the elemental areas of the luminescent screen, it is possible to utilize deflection power of a relatively low order of magnitude. This is possible because the secondary electrons have relatively low velocities, thereby rendering the beams formed of such electrons more readily subject to deflection than electron beams of higher velocities. Furthermore, the employment of the feature of secondary electron emission in a tube of the character described enables the reproduction of images having greater brilliance than heretofore possible by the use of conventional phosphor-exciting electron beams. Such a feature more than compensates for any losses which may result from the necessity of the primary electron beam to penetrate the metallic layer or film of the secondary electron emissive electrode. Moreover, by reason of the use of a secondary electron emitting structure of the character described, it is possible to utilize, as the primary scanning beam, one having relatively low electron velocities such as, for example of the order of 500–1000 volts. Here, again the utilization of a scanning beam of such a character enables a saving of deflection power.

It, now, will be appreciated that the particular character of color television systems in which image reproducing systems and cathode ray tubes embodied therein and having electrode structures of the type disclosed herein in accordance with the invention is in no way limited to that illustratively shown and described. Tubes and image reproducing systems of the character disclosed in accordance with this invention may be used with substantially equal facility in any of the presently known types of color television systems. In general, these systems fall into four categories. One well known color television system is that which is commonly referred to as a field or frame sequential type in which video signals representative of complete fields or frames of the different component colors of the image to be reproduced are transmitted in time sequence. Another system is that which is commonly known as a line sequential type in which video signals representing successive color component lines of the image to be reproduced are transmitted in time sequence. Still another color television system which has more recently been developed is that which is referred to as a dot multiplex type which forms the subject matter of the copending U. S. application of John Evans previously referred to. A fourth well known system with which the present invention may be used is the simultaneous type such as that covered by U. S. Patent No. 2,335,180, issued November 23, 1943, to A. N. Goldsmith and entitled "Television System." In a simultaneous color television system the video signals representing the different color components of the image to be reproduced are transmitted and received simultaneously in individual signaling channels.

The improved color television image reproducing system embodying a cathode ray tube such as disclosed herein in accordance with this invention, may quite readily be adapted for use in any of the color television systems of the four general types referred to. The only modification of the presently disclosed color television system which is required is one which may readily be made by persons skilled in the art. It merely is necessary to make obvious adjustments of the circuits disclosed herein, whereby to alter the frequency at which the color-selecting apparatus is energized by the stepped wave voltage. For example, in the dot multiplex type of system disclosed specifically herein, for illustrative purposes, the stepped wave voltage varies the potential impressed upon the color-selecting system at a relatively high frequency equal, in the illustrative example, substantially to three times the dot or elemental video signal frequency. For the incorporation of a color television system in accordance with this invention in the so-called line sequential type of system, it merely is necessary to alter the frequency at which the energization of the color-selecting system is modified to be substantially equal to the line or horizontal scanning frequency. Similarly, in a field or sequential type of television system the energization of the color-selecting facilities in accordance with this invention is modified substantially at the field or frame scanning frequency. Similar suitable adjustments of the energization of the color-selecting system may be made for adaptation of the invention for use in a simultaneous color television system.

It will be understood that the foregoing disclosure of several illustrative embodiments of the invention is not to be considered as necessarily limiting, but instead is intended to teach the principles underlying the invention, the scope of which may be determined by reference to the following claims.

What is claimed is:

1. A color television image reproducing system, comprising a cathode-ray tube having a luminescent screen provided with a plurality of groups of subelemental size areas respectively capable of producing light of different colors when excited by an electron beam, means for controlling a primary electron beam to effect scanning of successive elemental areas of said screen and to determine intensity of the produced light in accordance with intelligence signals, means responsive to said primary electron beam to develop at each of said elemental screen areas a single secondary electron beam for each of said groups of subelemental size color producing screen areas, and deflection means for controlling each of said secondary electron beams to selectively excite any one of the color producing screen areas of its associated group of such screen areas.

2. A color television image reproducing system, comprising a cathode-ray tube having a luminescent screen provided with a plurality of groups of subelemental size areas respectively capable of producing light of different colors when electronically excited, means for developing a primary electron beam having an intensity varying in accordance with video signals representative of a plurality of image component colors, means for variably directing said primary electron beam toward successive elemental areas of said screen, means dependent upon said primary electron beam for developing at each of said elemental screen areas a single secondary electron beam for each of said groups of subelemental size color producing screen areas and having an intensity varying in accordance with respective instantaneous intensities of said primary electron beam, and deflecting means effecting excitation by each of said secondary electron beams of any one of the color producing screen areas of its associated group of such screen areas.

3. A color television image reproducing system, comprising a cathode ray tube having a luminescent screen provided with a plurality of groups of areas respectively capable of producing light of different colors when excited by an electron beam, means for developing a primary electron beam having an intensity varying in accordance wtih video signals representative of a plurality of image component colors, means for deflecting said primary electron beam to select the group of screen areas to be excited, means employing said primary electron beam to develop a secondary electron beam for each of said groups of screen areas, and path direction control means for causing each of said secondary electron beams to excite any selected one of the areas of each of said groups of screen areas in correspondence with the image color components represented by the concurrently received video signals.

4. A color television image reproducing system, comprising a cathode ray tube having an electron gun source of a primary electron beam, an electrode source of a plurality of secondary electron beams and a luminescent screen provided with a plurality of groups of elongated adjacent areas of sub-elemental width, said areas being respectively capable of producing light of different colors when excited by an electron beam, means for receiving composite television signals including video and synchronizing signals, said video signals being representative of a plurality of image component colors, means coupling said video signal receiving means and said electron gun for modulating the intensity of said primary electron beam in accordance with said video signals, means including a primary electron beam deflection system coupled to said synchronizing signal receiving means for deflecting said primary electron beam over said secondary electron emissive electrode to develop secondary electron beams emanating from respective elemental areas of said electrode, and means responsive to color changes of said received video signals for deflecting each of said secondary electron beams to selectively excite any one of said sub-elemental screen areas of the associated group of said areas.

5. A color television image reproducing system, comprising a cathode ray tube having an electron gun source of a primary electron beam, an electrode source of a plurality of secondary electron beams and a luminescent screen provided with a plurality of groups of elongated adjacent areas of sub-elemental width, said areas being respectively capable of producing light of different colors when excited by an electron beam, means for receiving composite television signals including video and synchronizing signals, said video signals being representative of a plurality of image component colors, means coupling said video signal receiving means and said electron gun for modulating the intensity of said primary electron beam in accordance with said video signals, means including a primary electron beam deflection system coupled to said synchronizing signal receiving means for deflecting said primary electron beam over said secondary electron emissive electrode to develop secondary electron beams emanating from respective elemental areas of said electrode, mans including a secondary electron beam deflecting system for deflecting each of said secondary electron beams to selectively excite any one of said sub-elemental screen areas of the associated group of said areas, and means responsive to color changes of said received video signals for variably energizing said secondary electron beam deflecting system.

6. In a cathode ray tube for use in a color television system, a luminescent screen having a plurality of groups of adjacent areas of sub-elementary dimensions, the excitation of said respective areas by an electron beam being effective to produce differently colored light, and means including an electrode spaced from said screen for developing a plurality of secondary electron screen-exciting beams emanating respectively from successive elemental areas thereof as a result of the successive impingement of said respective electrode areas by a primary electron beam, only one of said screen-exciting beams being produced for each group of said screen areas, said electrode including a mesh structure defining apertures, a substantially continuous electron-pervious metallic layer supported on the primary electron beam side of said mesh structure and having those portions of the side thereof opposite to that impinged by said primary electron beam which are in registry with said mesh apertures treated for secondary electron emission, and secondary electron deflecting elements supported on the screen side of said mesh structure adjacent each of said apertures.

7. In a cathode ray tube for use in a color television system, a luminescent screen having a plurality of groups of adjacent elongated areas of sub-elemental width, the excitation of said respective areas by an electron beam being effective to produce differently colored light, and means including an electrode spaced from said screen for developing a plurality of secondary electron screen-exciting beams emanating from successive elemental areas thereof as a result of the successive impingement of said respective electrode areas by a primary electron beam, one of said screen-exciting beams being produced for each group of said screen areas, said electrode having a substantially continuous metallic layer which is pervious to primary electrons and having the side thereof which is opposite to that impinged by said primary electron beam provided with a coating for secondary electron emission, said coating having V-shaped elongated grooves formed therein.

References Cited in the file of this patent

UNITED STATES PATENTS

| | | |
|---|---|---|
| 2,270,232 | Rosenthal | Jan. 20, 1932 |
| 2,239,769 | Batchelor | Apr. 29, 1941 |
| 2,307,188 | Bedford | Jan. 5, 1943 |
| 2,446,440 | Swedland | Aug. 3, 1948 |
| 2,446,791 | Schroder | Aug. 10, 1948 |
| 2,573,777 | Sziklai | Nov. 6, 1951 |

FOREIGN PATENTS

| | | |
|---|---|---|
| 443,896 | Great Britain | Mar. 10, 1936 |
| 866,065 | France | June 16, 1941 |